G. M. Prentiss,
Inkstand.

No. 22,582.  Patented Jan. 11, 1859.

UNITED STATES PATENT OFFICE.

GEORGE M. PRENTISS, OF WORCESTER, MASSACHUSETTS.

INKSTAND.

Specification of Letters Patent No. 22,582, dated January 11, 1859.

*To all whom it may concern:*

Be it known that I, GEORGE M. PRENTISS, of the city and county of Worcester and State of Massachusetts, have invented a new and useful Improvement in Inkstands; and I do hereby declare that the following is a full, clear, and exact description of the same, reference being had to the annexed drawings, making part of this specification, in which—

Figure 1:
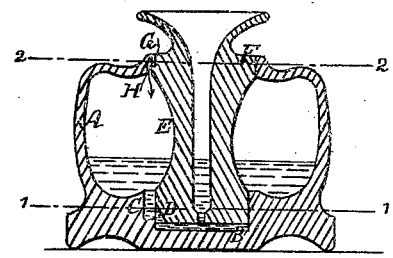
Figure 4:
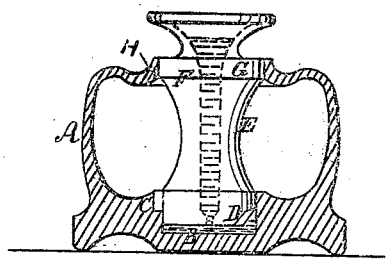
Figure 2:
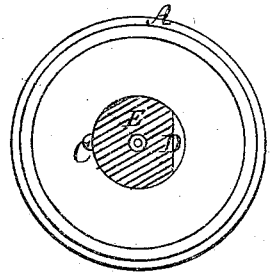
Figure 3:
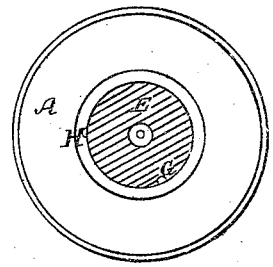

Figure 1 is a vertical section through the center of the improved inkstand. Fig. 2 is a horizontal section of the same; at the line 1, 1, of Fig. 1. Fig. 3 is a horizontal section of the same; at the line 2, 2, of Fig. 1. Fig. 4 is a vertical section through the center of the inkstand and a side elevation of the stem or plunger, with the ink represented as raised in the cup of the same.

Similar letters in the figures refer to corresponding parts.

This invention consists of an improved article of manufacture, viz, an inkstand having a plunger, constructed and fitted as herein shown and described.

To enable others skilled in the art to make and use my invention, I will proceed to describe its construction and operation.

The inkstand A, may be formed of glass or any other desired material not affected by acids, and can be made of round, square or of any other form and design, which the judgment of the manufacturer may dictate. The well or depression B, is made in the center of the bottom of the same, and has a slot or depression C, formed on one side of the upper part of its periphery, so as to enable a slot or depression D, formed on the lower part of the periphery of the plunger or stem E, to form a communcation with the same when turned directly opposite each other. Near the upper end of the said stem or plunger is formed a circular shoulder F, of any desired size in comparison with the lower portion fitting in the well or depression B, on the upper part of the periphery of which is formed a slot or depression G, extending from its extreme upper corner a short distance below a point midway between the upper and lower corners of the shoulder, so as to communicate at its lower end with the upper end of a corresponding slot or depression H, formed in the lower part of the periphery of the opening in which the shoulder moves, when brought or turned opposite the same, in precisely the same manner as the communication is effected betwen the slots or depressions C, D, in the well, and the lower part of the stem or plunger. The upper end of the stem or plunger terminates in an inverted frustum of a cone or flared cup and its sides, between the shoulder F and lower end, are scolloped out or curved inward, in order to lessen the diameter and thereby admit more space for the ink in the stand. The channel through the center of the plunger or stem, extends downward from the apex of the cup, to within a short distance of the bottom of the same, at one uniform diameter, when it is suddenly reduced to about one quarter of its original size, and extended at this reduced size to the bottom of the stem or plunger, to cause the ink admitted through the smaller portion of the channel to be in a manner checked by the greater body of ink in the enlarged portion, in its passage upward, during the descent of the stem or plunger, and to thereby prevent it being jetted over the top of the cup above, as it would otherwise have a tendency to do.

When it is desired to raise the ink to the required height in the cup Z, the plunger or stem is turned, so as to bring the slot or depression in the lower part of the periphery of the same, opposite to the solid part of the well or depression, and then it is raised sufficiently high to allow the upper part of the slot or depression D, in the lower part of the periphery of said stem or plunger so as to admit the ink into the well or depression below the same; and the said stem or plunger is then forced down into the well, causing the ink to rise in the channel-way in the stem or plunger. In case it is desired to cause the ink to flow from the cup into the inkstand, the stem or plunger E, is turned so as to respectively bring the slots or depressions G, H, and C, D, on the shoulder F. and opening in which it fits, and the lower part of the stem or plunger, and well or depression in the bottom of the inkstand, opposite each other, and by thus opening the communication between the outside and inside of the inkstand for the admission of air, and between the channel-way in the stem or plunger, and the interior of the inkstand, to produce the result.

Having described my invention, I claim and desire to secure by Letters Patent, as an improved article of manufacture—

An inkstand having a plunger E, constructed and fitted as herein shown and described.

GEO. M. PRENTISS.

Witnesses:
S. J. COHEN,
JAMES LORD.